C. CORY.
Evaporating Pan.
No. 44,162
Patented Sept. 13, 1864
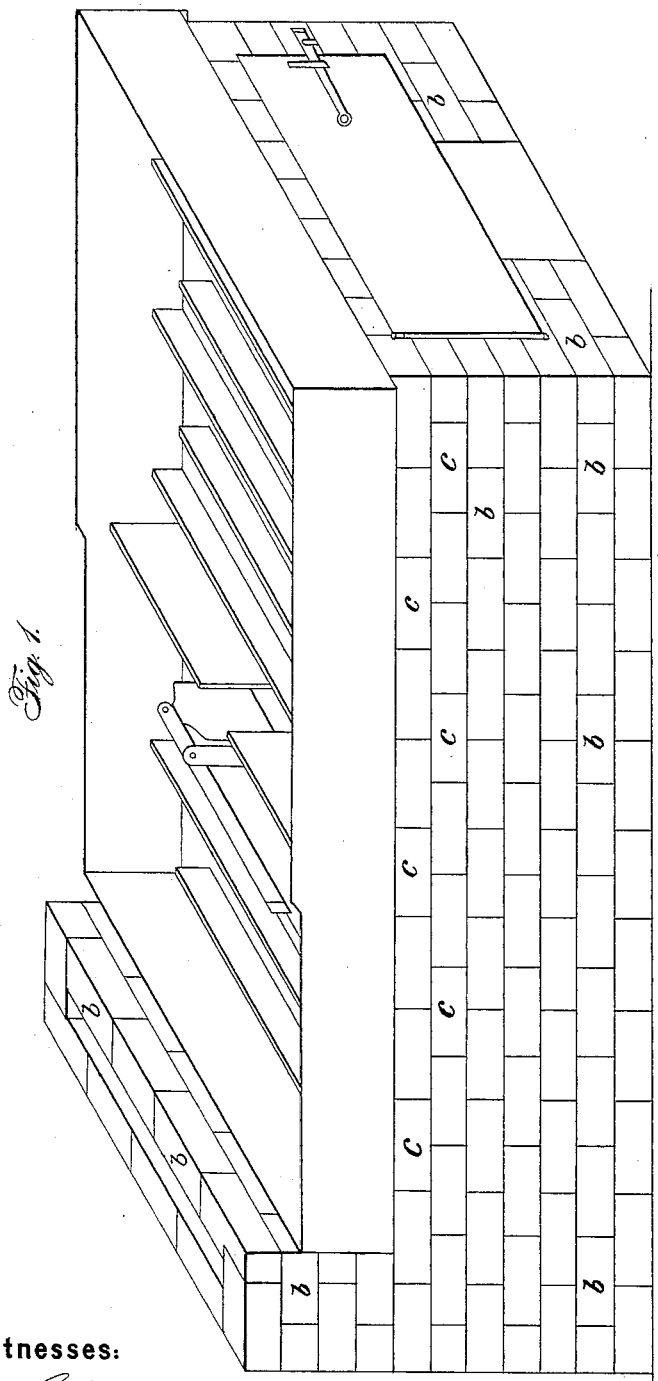
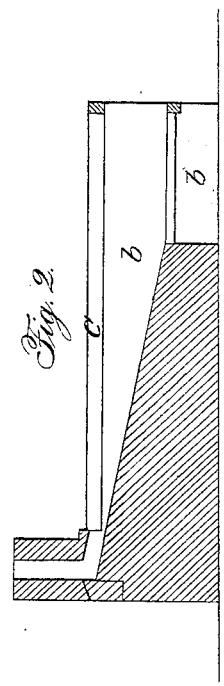
Witnesses:
C. D. Smith
R. N. Eagle
Inventor:
Christopher Cory

UNITED STATES PATENT OFFICE.

CHRISTOPHER CORY, OF LIMA, INDIANA.

IMPROVED FURNACE FOR CLARIFYING CIDER, &c.

Specification forming part of Letters Patent No. 44,162, dated September 13, 1864.

*To all whom it may concern:*

Be it known that I, CHRISTOPHER CORY, of the town of Lima, county of La Grange, and State of Indiana, have invented a new and improved mode of constructing furnaces for clarifying and condensing cider, the juices of other fruits, and saccharine fluids; and I do hereby declare that the following is a full and exact description thereof, reference being had to the accompanying drawings, and to the letters of reference marked thereon.

The nature of my invention consists in forming the upper portion of the side walls of the furnace, at or near its contact with its superincumbent evaporator, of gypsum or other materials of inferior heat-conducting qualities, which will prevent or retard the conveyance of the heat to excess from said walls to the sides of said evaporator.

That others may be able to enjoy the benefits of said invention, I submit the following statements.

The furnace on the main may be built after the most approved method now in common use, with ash-pit, grate-bars, fire-doors and frame, well-adjusted flue, chimney, damper, &c., and with appropriate depth and width of wall. It may also be built of any of the materials now in common use, except at or near its connection with said pan, where the said gypsum, calcined or otherwise arranged, or other non-conducting material is used, in one, two, or more layers, to the completion of said furnace. These materials may be used in the form of bricks, blocks, or mortar, or in a pulverized state with suitable casings.

In the ordinary furnace, built of brick wholly or stone, it is found that when long continued under intense heat these side walls impart too much heat to the portions of the pan lying above them for the safety of the pan as usually made, and also for the perfecting of the best methods of clarifying and condensing these fluids. By the adoption of this invention as above specified these difficulties are obviated, while much ease of management and greater capacity and perfection are added to the implement.

In the accompanying drawings, Figure 1 is a perspective view of my improved furnace; and Fig. 2 is a vertical longitudinal section of the same with the pan removed, this view being made on a smaller scale.

$b\ b$ are the portions made of brick or other materials, and $c\ c$ the position of the non-conducting substances.

In presenting this application for Letters Patent, I do not claim any particular form of furnace; but I do claim as my invention—

The formation of furnaces for clarifying or condensing the juices of apples and other fruits, and also saccharine fluids, with one or more of the upper strata of their side walls made of gypsum, calcined or otherwise, or of other inferior or non-conducting materials, by which the excess of heat to the sides of the pan by contact with the walls of said furnace is prevented, substantially as and for the purposes herein set forth.

CHRISTOPHER CORY.

Witnesses:
J. W. CUMMINGS,
S. L. CRISSEY.